United States Patent
Kilian et al.

(10) Patent No.: US 6,786,145 B2
(45) Date of Patent: Sep. 7, 2004

(54) SAFETY DEVICE FOR A MANUFACTURING MACHINE, FOR EXAMPLE A FOLDING PRESS

(75) Inventors: Friedrich Kilian, Weissach-Flacht (DE); Gerhard Sperrer, Wartberg/Krems (AT)

(73) Assignee: Trumpf Maschinen Austria GmbH & Co., KG., Pasching (AT)

( * ) Notice: Subject to any disclaimer, the term of this patent is extended or adjusted under 35 U.S.C. 154(b) by 5 days.

(21) Appl. No.: 10/211,946

(22) Filed: Aug. 2, 2002

(65) Prior Publication Data

US 2004/0020255 A1 Feb. 5, 2004

Related U.S. Application Data

(63) Continuation of application No. PCT/AT01/00025, filed on Jan. 31, 2001.

(30) Foreign Application Priority Data

Feb. 4, 2000 (AU) .......................................... A 175/2000

(51) Int. Cl.$^7$ ................................................. F16P 3/14
(52) U.S. Cl. ....................................... 100/348; 100/99
(58) Field of Search ................................. 100/341, 342, 100/343, 348, 344, 345, 349, 99; 72/1, 3

(56) References Cited

U.S. PATENT DOCUMENTS

| 1,962,742 A | * | 6/1934 | Jongedyk ................. 192/129 A |
| 2,082,210 A | * | 6/1937 | McMaster ..................... 74/615 |
| 4,660,703 A | | 4/1987 | Filcich et al. |
| 5,579,884 A | | 12/1996 | Appleyard et al. |
| 6,047,634 A | * | 4/2000 | Futsuhara et al. ............. 100/43 |
| 6,114,690 A | * | 9/2000 | Oei et al. .................... 250/221 |
| 6,334,077 B1 | * | 12/2001 | Futsuhara et al. .......... 700/206 |

FOREIGN PATENT DOCUMENTS

| AU | 566 795 B | 10/1987 |
| DE | 3830488 | 3/1990 |
| WO | WO 9725568 | 7/1997 |

\* cited by examiner

Primary Examiner—Allen Ostrager
Assistant Examiner—Shelley Self
(74) Attorney, Agent, or Firm—Alston & Bird LLP

(57) ABSTRACT

The invention describes a safety device (45), in particular a beam-emitting and beam-receiving system for a production machine (1), e.g. an edging press, with a retaining mechanism (51) for the safety device (45) on a press beam (16) to which bending and/or pressing tools can be attached. The retaining mechanism (51) has at least one retaining means (52) designed to be received in a tool holder device (35). A detection system (66) wired to the machine control system of the production machine (1) is provided between the tool holding device (35) and the retaining means (52).

14 Claims, 2 Drawing Sheets

SAFETY DEVICE FOR A MANUFACTURING MACHINE, FOR EXAMPLE A FOLDING PRESS

CROSS-REFERENCE TO RELATED APPLICATION

This application is a continuation of International Patent Application No. PCT/AT01/00025 filed Jan. 31, 2001, which designated inter alia the United States.

FIELD OF THE INVENTION

The invention relates to a safety device for a production machine such as an edging press or folding press.

BACKGROUND OF THE INVENTION

In order to protect operating personnel, it is common practice to fit production machinery, in particular presses, edging presses, etc., with safety devices in the form of a beam-emitting and beam-receiving system, by means of which an access zone in the region of a manufacturing tool is monitored. If a beam bundle or beam curtain is interrupted, e.g. by a finger or a hand of the operator, the production machine is brought to a halt, or at least switched to creep mode, by the machine control system in order to prevent an accident. In order to operate this monitoring system reliably and with the requisite degree of accuracy, it must be accurately set up and steps must also be taken to rule out any manipulation which would render the safety device ineffective yet allow the production machine to operate.

SUMMARY OF THE INVENTION

This objective is achieved by the invention by using a detector system and a retaining means for the safety device in the receiving mechanisms directly assigned to the tool, whereby it is not possible for the production machine to be used unsafely due to an operator, who usually has no knowledge of how a detection system works, manipulating the safety device, thereby ensuring a high degree of operating safety.

Another possible embodiment of the invention enables the safety device to be rapidly adapted to a whole range of different tools which might be used on machines of this type and offers a simple means of setting up exact settings for operating purposes.

Further advantageous embodiments of the invention simplify mounting of the safety device on the production machine.

Certain embodiments also offer advantages because coded signals are used which affords increased protection against unauthorized manipulation.

Advantageous embodiments enable an exact guiding action to be achieved, which facilitates positioning of the beam emitter and the beam receiver relative to one another.

Features of other possible embodiments afford an inexpensive and technically effective solution.

There is also disclosed an advantageous embodiment whereby, in a situation where a safety device is placed on a part of the mechanism projecting beyond the tool end or there are other obstacles during upward motion of the pressing tool, the safety device can be displaced unhindered, thereby effectively preventing damage during such a manoevre.

A further embodiment offers a simple design.

Finally, another embodiment is of advantage because it enables rapid pre-positioning of the retaining means, thereby simplifying the process of changing fittings.

BRIEF DESCRIPTION OF THE DRAWINGS

To provide a clearer understanding of the invention, it will be described in more detail with reference to the examples of embodiments illustrated in the appended drawings.

Of these.

Figure 1:
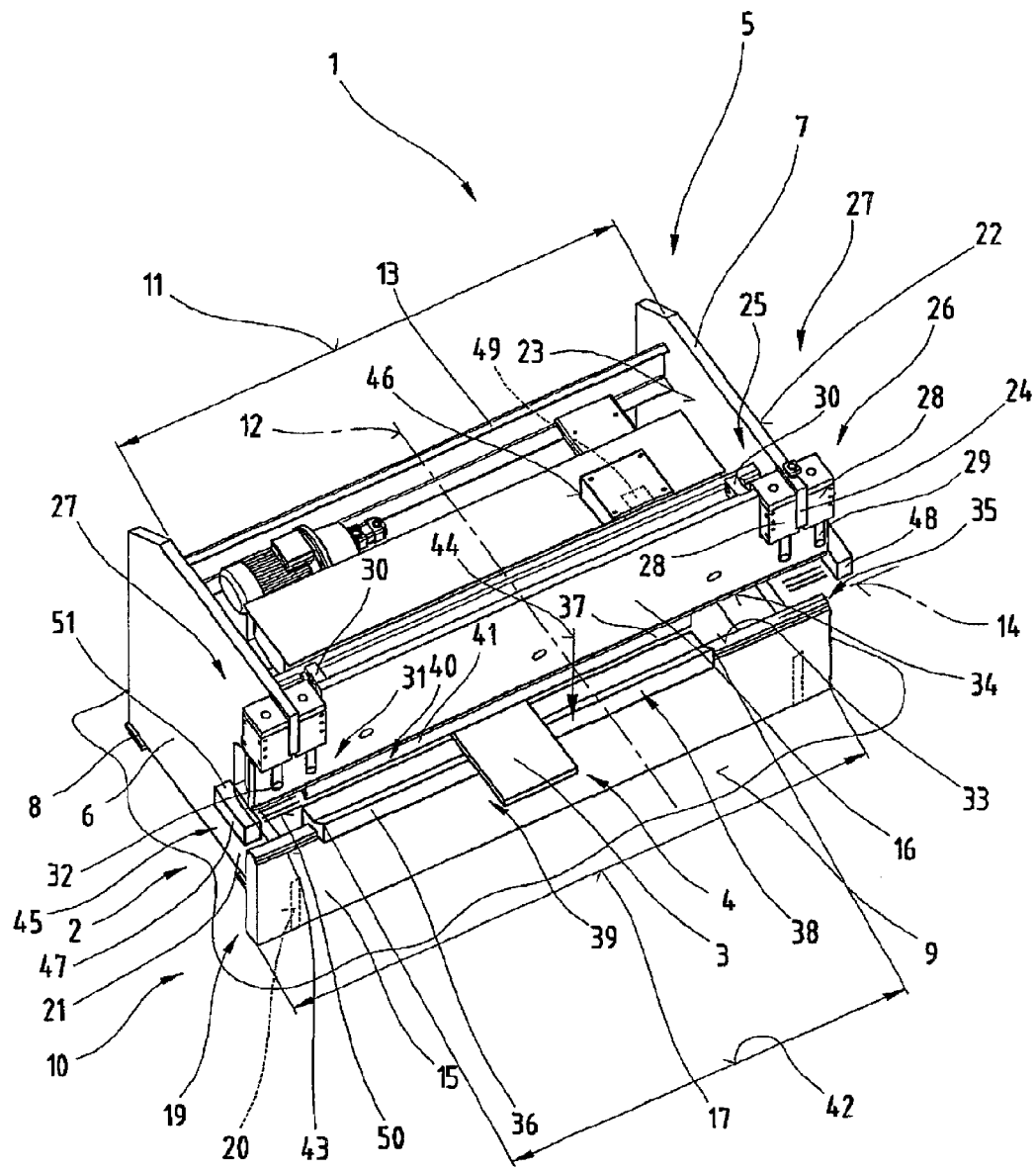
FIG. 1 is a simplified, schematic diagram of a production machine fitted with the safety device proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

DETAILED DESCRIPTION OF PREFERRED EMBODIMENTS

FIG. 1 illustrates a production machine 1, in particular an edging machine 2, for shaping sheet metal parts 3 to make housing parts, sections, etc. Production machines 1 of this type are specifically used to make elongate sections 4, e.g. an angled section, U-section, Z-section, etc., where the lengths involved are generally long relative to the cross-sectional dimension.

A machine frame 5 of the production machine 1 essentially consists of two parallel C-shaped supporting side plates 6, 7, spaced at a distance apart from one another, which are supported directly, or if necessary via damping elements 8 for example, on a standing surface 9 or in another embodiment, as illustrated, mounted on a common bed plate 10, in particular welded to it. The supporting side plates 6, 7, are also joined to one another by means of wall parts 13 extending in a space 11 perpendicular to a mid-plane 12.

By reference to a working plane 14 running parallel with the standing surface 9, the production machine 1 has two press beams 15, 16 lying opposite one another, which extend across a length 17 that is generally determined by the size of the machine or the working length provided for bending the sheet metal parts 3.

The press beam 15 facing the standing surface 9 is secured to the machine frame 5 by means of a fixing arrangement 19, preferably directly on end faces 20 of legs 21 of the C-shaped side plates 6, 7 assigned to the bed plate 10, in particular by means of a weld joint. Arranged on side faces 22, 23 of legs 24 of the C-shaped supporting side plates 6, 7 and spaced at a distance from the standing surface 9, are actuator drives 25, 26 of the drive arrangement, actuatable by a pressurising medium, provided in the form of double acting hydraulic cylinders 28. Actuator elements 29, e.g. piston rods, of the hydraulic cylinders 28, are drivingly linked, for example by means of articulated bearings 31 and bolts 32, to the press beams 16, which is mounted so as to be displaceable in guide arrangements 30 of the machine frame 5 in a direction running perpendicular to the working plane 14. The press beam 15 and the press beam 16 extend across the length 17 in a more or less symmetrical arrangement and in a direction perpendicular to the mid-plane 12, the length 17 being slightly longer than the distance 11.

On end faces 33, 34 directed towards one another and running parallel with the working plane 14, the press beams 15, 16 have tool holder devices 35 for supporting and releasably attaching bending tools 36, 37. In a manner known from the prior art, these bending tools 36, 37 are generally provided as a swage 39 in the form of a die 38 and a punch 40 in the form of a stamp 41. Also in a manner known from the prior art, the bending tools 36, 37 are divided into sections, so that the tool length 42 can be readily varied to adapt them to different requirements and facilitate re-fitting of the production apparatus 1 or changing bending tools 36, 37.

The tool holder devices 35 in the press beams 15, 16 are, firstly, designed for releasably attaching the bending tools 36, 37 and, secondly, constitute the supporting surfaces 43 for transmitting the bending forces—as indicated by arrow 44.

As may also be seen from FIG. 1, the production apparatus 1 is also provided with a safety device 45, which is wired to a machine control system 46 and consists of a beam emitter 47 and a beam receiver 48 and a control device 49 preferably integrated in the machine control system 46. The beam emitter 47 and the beam receiver 48 are joined to the displaceable press beam 16 so as to be non-displaceable and preferably designed to generate light beams 50. To monitor the safety of the entire working region, the light beams 50 are guided parallel with the tool path and across the entire length 17 of the press beams 15, 16. By preference, there are several light beams 50 running parallel with one another, which form a sort of curtain of light arranged in a plane running parallel with the standing surface 9. The beam emitter 47 and the beam receiver 48 are releasably connected by means of a retaining mechanism 51 to emitting and receiving optics facing one another in the end region on the displaceable beam 16.

Figure 2:
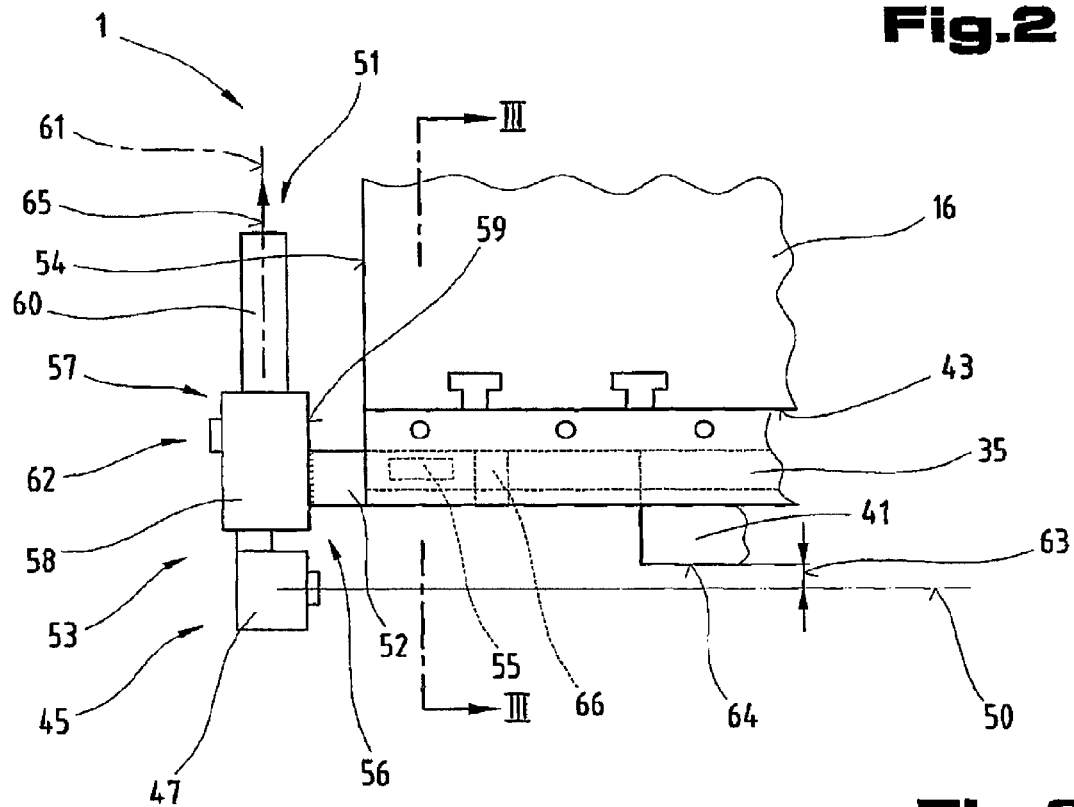
FIG. 2 is a detail of the safety device proposed by the invention viewed in partial section.
Figure 3:
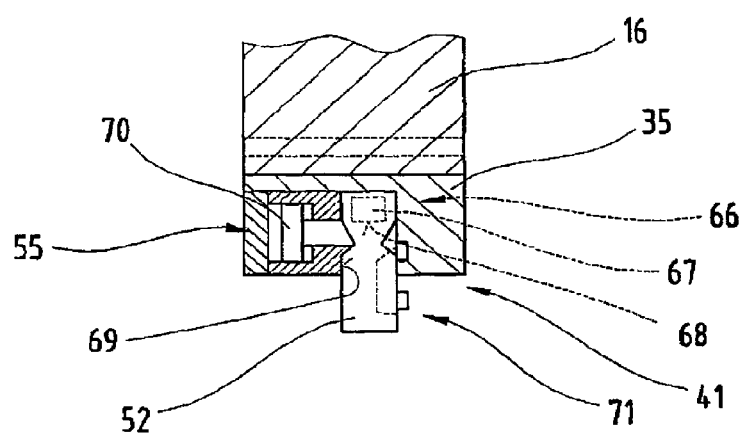
FIG. 3 shows the safety device in section, along the line III—III indicated in FIG. 2.

FIGS. 2 and 3 illustrate the retaining mechanism 51 for the beam emitter 47, for example, on the production machine 1. It consists of a retaining means 52 and an adjusting mechanism 53 connected to the latter. The retaining means 52 is placed in the groove-shaped tool holder device 35 projecting beyond an end face 54 of the press beam 16 and retained by means of a clamping mechanism 55. On an end region 56 projecting beyond the end face 54, the adjusting mechanism 51 is fixed in a sort of telescope arrangement 57. It consists of a square tube 58, which is attached via a side face 59 on the terminal face end of the retaining means, for example, and displaceably guided therein, an actuator element 60 non-displaceably connected to the beam emitter 47. A longitudinal mid-axis 61 of the telescope arrangement 57, in which direction the actuator element 60 is displaceable in the square tube 58, runs in a direction perpendicular to the supporting surface 43 of the press beam 16. A catch arrangement 62 acting between the square tube 58 and the actuator element 60 enables the actuator element 60 to be displaced in steps, thereby enabling a distance 63 to be set, from which the light beams 50 are displaced towards the supporting surface 43 opposite a bending edge 64 of the punch 41 for operating purposes. The distance 63 is prescribed by the relevant safety regulations governing the effective prevention of accidents and is a few millimetres.

The catch arrangement 62 has several basic positions, enabling a rapid adjustment corresponding to bending tools 41 of different standard heights. Furthermore, the catch arrangement 62 enables unhindered displacement of the actuator element 60 and hence the beam emitter 47—in the direction of arrow 65—in other words towards the working direction of the press beam 16. This ensures that if the beam emitter 47 is damaged if it comes into contact with an obstacle occurring during the bending process, e.g. as a result of workpieces projecting beyond the bending tool 41. Arranged between the tool holder device 35 and the retaining means 52 is a detection system 66, consisting of contact elements 67, 68 which can be brought into engagement, for example, and at least the contact element 67 arranged in the tool holder device 35 is wired to the machine control system 46 and the control device 49.

This provides a monitoring system which will not enable unrestricted operation of the production machine 1 unless a safety device 45 is present and operating correctly. The detection system 66 may also be designed to exchange coded signals, which will actively prevent manipulation and hence operation of the production machine 1 if the safety device has been bypassed or will permit only restricted operation, e.g. by automatically switching to "creep mode".

Instead of using the contact elements 67, 68, it would naturally also be possible to use a detection system 66 with contactless signal transmission, to monitor correct usage and corresponding operation of the safety device 45. Contactless signal transmission means of this type might include, for example, means for transmitting radiation, waves, magnetic fields, etc. To provide additional security against unauthorised manipulation, it is also possible to use coded signals, in particular with a detection system 66 provided with contactlessly communicating signal transmitter and receiver elements co-operating with coding and decoding means, e.g. of the control device 49.

The retaining mechanism 51 for the beam emitter 47 described above is also provided in the same way for the beam receiver 48, whereas only one detection system 66, also as described above, is generally provided, in other words either on the retaining mechanism 51 for the beam emitter 47 or on the retaining mechanism 51 for the beam receiver 48.

In terms of its cross-sectional dimensions, the retaining means 52 is adapted to match the cross-sectional dimension of a housing slot 69 for the stamp 41 in the tool holder device 35. The clamping mechanism 55 described may be a separate clamping mechanism 55 for the retaining means 52 but it would also be possible to clamp the retaining means 52 together with the standard hydraulic clamping mechanism 55 used for tools of this type, particularly stamps 41, in the housing slot 69 with a clamping element 70 known from the prior art which can be pressurised with pressurising medium, such as a hydraulic piston, for example. Naturally, however, clamping systems may also be used for the retaining means 52 independently of the clamping mechanism 55 used for the tools.

Another possibility is to hold the retaining means 52 in the housing slot 69 with a releasable locking arrangement 71, so that when the clamping mechanism 55 is released, the retaining means 52 is still held in the housing slot 69 until manually released.

For the sake of good order, it should finally be pointed out that in order to provide a clearer understanding of the structure of the safety device 45, it and its constituent parts have been illustrated out of scale to a certain extent and/or on an enlarged and/or reduced scale.

The tasks underlying the independent inventive solutions can be found in the description.

Above all, subject matter relating to the individual embodiments illustrated in FIGS. 1; 2, 3 can be construed as independent solutions proposed by the invention. The tasks and solutions can be found in the detailed descriptions relating to these drawings.

List of Reference Numbers

1 Production machine
2 Edging machine
3 Sheet metal part
4 Section
5 Machine frame
6 Supporting side plate
7 Supporting side plate
8 Damping element
9 Standing surface
10 Bed plate
11 Space
12 Mid-axis
13 Wall part
14 Working plane
15 Press beam
16 Press beam
17 Length
18
19 Fixing arrangement
20 End face
21 Leg
22 Side face
23 Side face
24 Leg
25 Actuator drive
26 Actuator drive
27 Drive arrangement
28 Hydraulic cylinder
29 Actuator element
30 Guide arrangement
31 Articulated bearing
32 Bolt
33 End face
34 End face
35 Tool holder device
36 Bending tool
37 Bending tool
38 Die
39 Swage
40 Punch
41 Stamp
42 Tool length
43 Supporting surface
44 Arrow
45 Safety device
46 Machine control system
47 Beam emitter
48 Beam receiver
49 Control device
50 Light beam
51 Retaining mechanism
52 Retaining means
53 Adjusting mechanism
55 Clamping mechanism
56 End region
54 End face
57 Telescope arrangement
58 Square tube
59 Side face
60 Actuator element
61 Longitudinal mid-axis
62 Catch arrangement
63 Distance
64 Bending edge
65 Arrow
66 Detection system
67 Contact element
68 Contact element
69 Housing slot
70 Clamping element
71 Locking arrangement

What is claimed is:

1. A safety device for a press device having a press beam supporting a tool holder that is structured and arranged to releasably hold bending or pressing tools, the press device further comprising a control system operable to control operation of the press device, the safety device comprising:
    a pair of cooperative beam devices comprising a beam emitter and a beam receiver operable to receive a beam emitted by the beam receiver;
    a first retaining mechanism supporting one of the beam devices;
    a second retaining mechanism supporting the other beam device;
    wherein at least one of the retaining mechanisms comprises a retaining member structured and arranged to be releasably installed in a tool-receiving slot of the tool holder of the press device so as to secure the retaining mechanism to the tool holder; and
    a detection system operable to detect, and to provide to the control system of the press device an indication of, whether or not the retaining member is installed in the tool holder, whereby the control system is able to restrict operation of the press device in the event that the detection system indicates the retaining member is not installed in the tool holder.

2. The safety device of claim 1, wherein said at least one of the retaining mechanisms includes an adjusting mechanism structured and arranged to adjustably position the beam device relative to the tool holder.

3. The safety device of claim 2, wherein the adjusting mechanism includes first and second actuator elements that are telescopically engaged with each other.

4. The safety device of claim 2, wherein the adjusting mechanism includes a catch arrangement structured and arranged to allow the beam device to be displaced in steps in a defined direction.

5. The safety device of claim 4, wherein the catch arrangement includes a safety trip releasing at least one direction of displacement.

6. The safety device of claim 1, wherein the detection system comprises cooperative contact elements respectively arranged in the tool holder and on the retaining member.

7. The safety device of claim 6, wherein the contact element arranged on the retaining member is integrated in the retaining member.

8. The safety device of claim 6, wherein the contact elements comprise contactlessly communicating signal transmitter and receiver elements.

9. The safety device of claim 8, further comprising coding and decoding means cooperating with the signal transmitter and receiver elements.

10. The safety device of claim 1, wherein a cross-sectional contour of the retaining member substantially corresponds to a cross-sectional contour of the slot in the tool holder.

11. The safety device of claim 1, further comprising a clamping mechanism structured and arranged to retain the retaining member in the tool holder.

12. The safety device of claim 11, wherein the clamping mechanism includes a clamping element pressurized with a pressurizing medium.

13. The safety device of claim 1, further comprising a releasable locking arrangement in the retaining mechanism for releasably locking the retaining member in the tool holder.

14. The safety device of claim 1, wherein one of the retaining mechanisms is mounted in one end of the slot in the tool holder adjacent one end face of the tool holder, and the other retaining mechanism is mounted in an opposite end of the slot adjacent an opposite end face of the tool holder, the beam emitter creating a curtain of light extending across a length of the press beam.

* * * * *

UNITED STATES PATENT AND TRADEMARK OFFICE
CERTIFICATE OF CORRECTION

PATENT NO. : 6,786,145 B2
DATED : September 7, 2004
INVENTOR(S) : Kilian et al.

It is certified that error appears in the above-identified patent and that said Letters Patent is hereby corrected as shown below:

<u>Title page,</u>
Item [30], Foreign Application Priority Data, "(AU)" should read -- (AT) --.

Signed and Sealed this

Fourth Day of January, 2005

JON W. DUDAS
*Director of the United States Patent and Trademark Office*